United States Patent [19]

Ueda et al.

[11] Patent Number: 5,294,968
[45] Date of Patent: Mar. 15, 1994

[54] DEVELOPING UNIT AND DRIVE TRANSMISSION ATTACHMENT

[75] Inventors: Kiyoshi Ueda; Mitsuyoshi Nagashita; Toshio Hagiwara, all of Hachioji, Japan

[73] Assignee: Konica Corporation, Japan

[21] Appl. No.: 903,380

[22] Filed: Jun. 24, 1992

[30] Foreign Application Priority Data

Jul. 9, 1991 [JP] Japan ............................. 3-168273
Jul. 10, 1991 [JP] Japan ............................. 3-169910
Jul. 11, 1991 [JP] Japan ............................. 3-171180
Jul. 19, 1991 [JP] Japan ............................. 3-179581

[51] Int. Cl.⁵ ............................................. G03G 15/06
[52] U.S. Cl. .................................. 355/245; 118/653; 222/DIG. 1
[58] Field of Search .................. 355/245, 260, 200; 118/653; 222/DIG. 1

[56] References Cited

U.S. PATENT DOCUMENTS

| | | | |
|---|---|---|---|
| 3,764,208 | 10/1973 | Takahashi et al. | 355/260 X |
| 4,797,704 | 1/1989 | Williams et al. | 222/DIG. 1 X |
| 4,985,731 | 1/1991 | Sakakura et al. | 355/200 X |
| 5,053,817 | 10/1991 | Ogiri et al. | 355/200 X |
| 5,134,441 | 7/1992 | Nagata et al. | 355/245 |

FOREIGN PATENT DOCUMENTS

0127761  6/1987  Japan.
0179168  7/1989  Japan.
0304576 12/1990  Japan.

Primary Examiner—A. T. Grimley
Assistant Examiner—William J. Royer
Attorney, Agent, or Firm—Jordan B. Bierman

[57] ABSTRACT

A developing apparatus for use with a photoreceptor to form a toner image, including a housing to store toner therein; an agitator having a shaft whose length is smaller than the inside dimension of the housing; a gear mechanism to transmit a driving force to the shaft member; and a coupling to couple the gear and the shaft, wherein the coupling is positioned inside the housing.

6 Claims, 5 Drawing Sheets

DEVELOPING UNIT AND DRIVE TRANSMISSION ATTACHMENT

BACKGROUND OF THE INVENTION

The present invention relates to a drive transmission means which is attached to a developing unit of an image forming apparatus.

Generally, the developing unit of an electrophotographic image forming apparatus is composed of: a developing unit main body which forms a housing; a first stirring member which stirs toner supplied into the developing unit; a second stirring member which is rotated in the opposite direction to the first stirring member; a supply roller which supplies to a developing sleeve a two component developer in which toner and carrier are fully stirred and mixed by the first and second stirring members; the developing sleeve; a developer thin layer forming means; and a drive transmission mechanism. An electrostatic latent image which is formed on the surface of a photoreceptor adjoining the developing sleeve with a predetermined gap, is given toner conveyed by the developing sleeve so that a toner image can be developed. Rotation of the stirring members, the supply roller and the developing sleeve is transmitted by the drive transmission mechanism section which is attached to a side surface of the developing unit main body.

Conventionally, for example, each stirring member and the supply roller are rotatably supported by bearing sections provided on both side portions in the longitudinal direction of the developing unit main body which forms a housing of the developing unit, and connected with the drive transmission means attached to one side portion of the developing unit main body so that rotation of a drive source can be transmitted.

As described above, when bearing sections of each stirring member and the supply roller are provided on both side portions of the developing unit main body, assembling the stirring members and the supply roller with respect to the developing unit main body is not simple, so that assembly is troublesome.

Further, conventionally, when the developing unit is assembled, the stirring members and the supply roller which are mounted in the developing unit, and the drive transmission member of the drive transmission mechanism are connected so that their mechanical phases match each other, for example.

Problems to Be Solved by the Invention

However, when phases of connecting portions provided respectively on the stirring member, the supply roller and the drive transmission member are matched so that they can be connected with each other, since a working space for the connection is small, and furthermore an operator can not observe the connecting work, it takes a long period of time and the work is troublesome. Furthermore this is a large obstacle to automatic assembly of the developing unit.

The first object of the present invention is to solve the aforementioned problems and to provide a developing unit in which matching of the phase of a rotational member or a swinging member equipped in the developing unit, with that of a drive transmission member of a drive transmission mechanism is not required, and they can be easily connected with each other.

Further, the present invention relates to bearing means of process members which are rotatably supported by process units provided in an electrophotographic image forming apparatus.

Generally, in this type of an electrophotographic image forming apparatus, there are provided process units, that is, a photoreceptor drum unit which is an image carrier, developing units which supply toner onto a electrostatic latent image formed on the surface of the photoreceptor drum and develop it, a fixing unit which thermally fixes a toner image transferred onto a recording sheet, and a cleaning unit which cleans the surface of the photoreceptor drum after the toner image has been transferred. Desired toner images are successively recorded on the surface of the recording sheets by each process unit.

Conventionally, each process member such as the photoreceptor drum, a toner stirring member, a fixing roller, and a cleaning roller, which are mounted on each process unit, is rotatably supported by the bearing section provided on, for example, a frame of an image forming apparatus or both side portions of a casing of the process unit.

Conventionally, a plurality of stirring members mounted in the process unit, that is, the developing unit, are rotatably supported by bearing sections provided on both side portions in the longitudinal direction of the developing unit main body which forms a housing of the developing unit. Seal members are provided on the bearing sections so that toner contained in the developing unit main body can not leak outside.

Accordingly, it takes a long period of time and is inefficient to mount the seal members in bearing sections one by one, or to fit shafts of stirring members into bearing holes of the bearing sections. This is a large obstacle to automatic assembly of the developing unit.

Bearing sections of the photoreceptor drum unit, the fixing unit and the cleaning unit have the same problem as the aforementioned, although seal members are not used therein.

The second object of the present invention is to solve the problem, to eliminate seal members, and further to provide a process unit of the image forming apparatus by which automatic assembling can be conducted efficiently.

SUMMARY OF THE INVENTION

The first object of the present invention is accomplished by a developing unit of an image forming apparatus in which toner is supplied onto an electrostatic latent image formed on the surface of a photoreceptor so that a toner image is developed, the developing unit being characterized in that: shaft members which are equipped in the developing unit to be rotated or swung, are set inside a developing unit main body which forms a housing of the developing unit; drive transmission members of drive transmission means which transmit drive to the shaft members, are extended into the inside of the developing unit main body; and the shaft members and the drive transmission members are connected within the developing unit main body.

The first object of the present invention is accomplished by a developing unit of an image forming apparatus by which toner is supplied onto an electrostatic latent image formed on the surface of a photoreceptor so that the electrostatic latent image is developed, the developing unit being characterized in that: when a rotational member or a swinging member equipped in the developing unit is connected with a drive transmission member which transmits drive to each member, a bar-like connecting member, one end of which is engaged with a drive transmission member of the drive transmission means, and the other end of which protrudes from the drive transmission member, is provided; a plurality of protrusions, which can transmit rotation, are provided on the peripheral surface of the protruded connecting member; a connecting section to be fitted with the connecting member is provided also on a shaft center of the rotational member or the swinging member opposite to a shaft center of the connecting member so that they can be detachably engaged with each other; and thereby they are connected so that drive can be transmitted.

The first object of the present invention is accomplished by a developing unit of an image forming apparatus in which toner is supplied onto an electrostatic latent image formed on the surface of a photoreceptor to develop it, the developing unit being characterized in that: a drive transmission means which is connected with a rotational member or a swinging member equipped in the developing unit so that drive can be transmitted, is structured in the manner that each drive transmission member of the drive transmission means is equipped in a casing of the drive transmission means formed by a plurality of supporting base materials in order to be structured into a unit.

The second object of the present invention is accomplished by a process unit of an image forming apparatus in which process units such as a photoreceptor, a developing unit, a fixing unit, and a cleaning unit are provided, the process unit of the image forming apparatus being characterized in that: bearing means of each process member such as a photoreceptor drum, a stirring member of the developing unit, a cleaning roller, and a fixing roller, which are rotatably supported by the process units, is provided in the process unit; and the bearing means is separated into upward and downward directions which cross at right angles with respect to the center of a supporting shaft by which the process member is supported.

DETAILED DESCRIPTION OF THE PREFERRED EMBODIMENT

An embodiment of the present invention will be explained as follows by referring to FIG. 1, a plan view showing a condition in which each shaft member is connected with a drive transmission mechanism section in a developing unit main body, FIG. 2, a side sectional view showing a structure of the drive transmission mechanism section, and FIG. 10, a side sectional view showing a structure of a developing unit.

However, the present invention is not limited to the embodiment.

Figure 10:
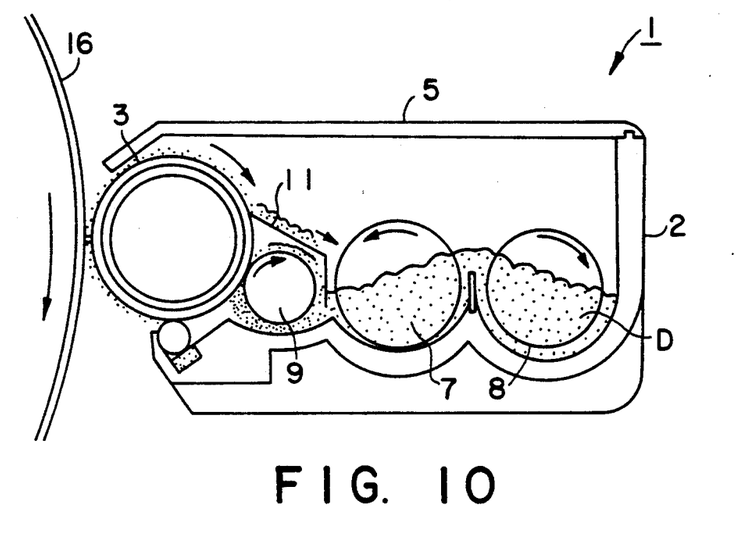
FIG. 10 is a side sectional view showing a structure of the developing unit.

FIG. 10 is a sectional view showing a principal section of a developing unit 1, and in the drawing, numeral 16 is a photoreceptor drum, numeral 2 is a developing unit main body, numeral 3 is a developing sleeve, numeral 5 is an upper cover, numeral 7 is a first stirring member, numeral 8 is a second stirring member, numeral 9 is a supply roller and numeral 11 is a scraper.

Toner supplied into the developing unit 1 is fully stirred and mixed with a carrier by a first stirring member 7 which is rotated in the arrowed direction and a second stirring member 8 which is rotated in the opposite direction to the first stirring member, and is fed as developer D to the developing sleeve 3 through the feed roller 9.

The first stirring member 7 and the second stirring member 8 are screw-like members which are rotated respectively in arrowed directions opposite to each other and have a spiral wound in a counterclockwise direction. Toner and carrier conveyed to the furthest side by the thrust of the second stirring member 8 are conveyed over a partition plate for stirring, whose upper end is inclined to be lower than the horizontal surface in the furthest side direction of the drawing, to the first stirring member 7, and conveyed to the nearest side of the drawing. Developer D which is charged by means of triboelectric charging caused by a mixing action of toner and carrier is caused to be homogeneous during the aforementioned conveyance, and adheres to the peripheral surface of the developing sleeve 3 in a layer by the supply roller 9 which is formed like a sponge and rotated in an arrowed direction.

The toner conveyed by the developing sleeve 3 is supplied onto the electrostatic latent image formed on the surface of the photoreceptor drum 16 which is separated from the surface of the developing sleeve 3 with a predetermined gap, and the toner image is developed. Rotations of stirring members 7 and 8, the supply roller 9, and the developing sleeve 3 are transmitted respectively by the drive transmission mechanism mounted on the side portion of the developing unit main body 2.

The present invention removes the aforementioned problems, and a connection method of the shaft member, which is equipped in the developing unit 1 and rotated or swung, with the drive transmission member of the drive transmission mechanism section is structured as follows.

A connection method of the stirring members 7 and 8, and the supply roller 9 with the drive transmission member will be explained as an example in the embodiment of the present invention as follows.

Figure 1:
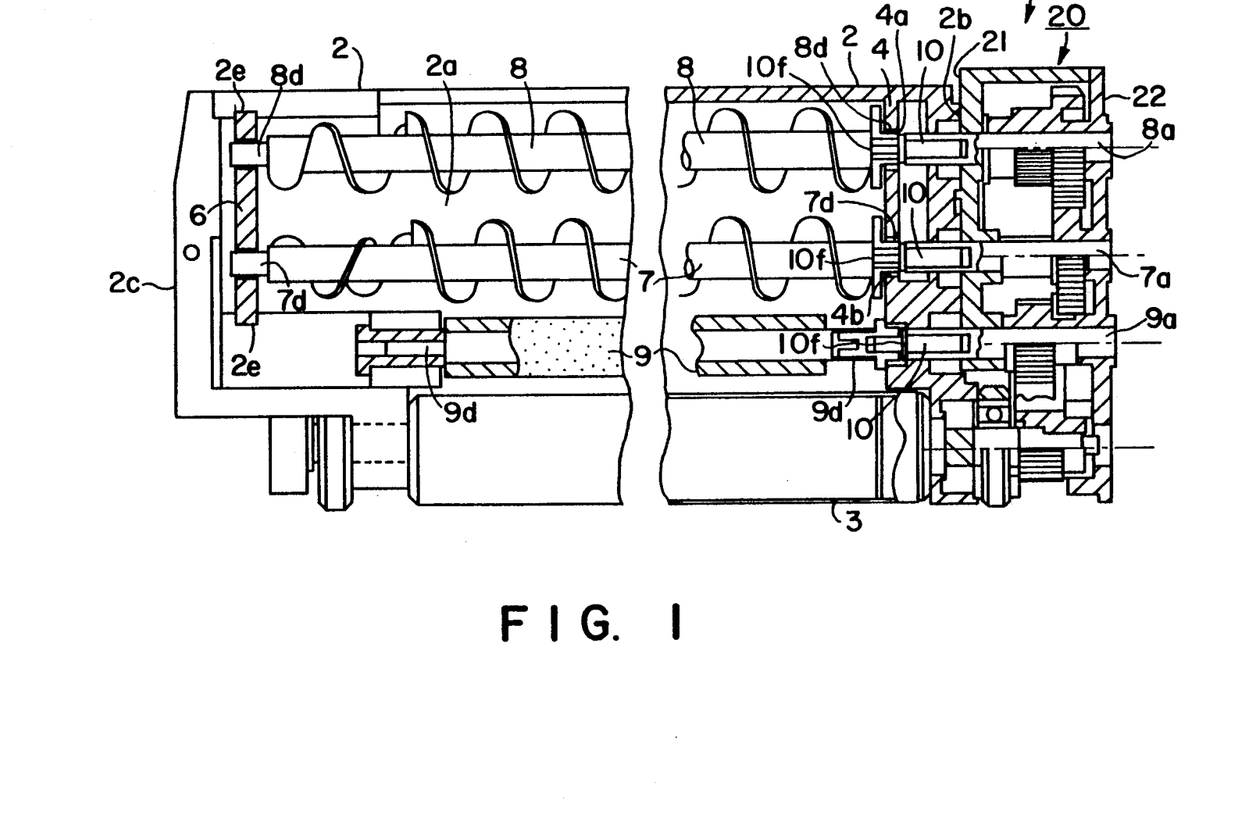
FIG. 1 is a plan view showing a condition in which each shaft member is connected with a drive transmission mechanism section in a developing unit main body of an embodiment of the present invention.

As shown in FIG. 1, the developing unit main body is a rectangular housing composed of: an upper surface which is opened in order to accommodate the stirring members 7 and 8, the supply roller 9, and the developing sleeve 3 to be assembled therein; a side surface in which a peripheral surface of the sleeve 3 side is opened; and a base surface section 2a. The length in the longitudinal direction of the developing unit main body 2 is the length in which the developing sleeve 3 can be accommodated, wherein the length of the developing sleeve 3 corresponds to that in the specification of the image forming apparatus in which a sheet of A4 size, for example, can be fed in the manner that the longitudinal direction of the sheet is in the same direction as that of the developing unit. An upper cover (shown in FIG. 10) is mounted on the upper surface of the developing unit main body 2 after the aforementioned members have been assembled, so that the housing can be hermetically structured except the side surface on the developing sleeve 3 side. A unit of the drive transmission mechanism section 20 is mounted on a right side surface 2b in the longitudinal direction of the developing unit main body 2.

The developing unit main body 2 is a molded member made of a synthetic resin material. A rectangular slot 2e is provided from the base surface 2a to the upper surfaces of both side surfaces in the lateral direction with a predetermined depth near the left side surface 2c inside the developing unit main body 2 as shown in FIG. 1, wherein a bearing section 6, which will be explained later, which supports supporting shafts 8d, 7d on the left side of the second stirring member 8 and the first stirring member 7, is inserted into the rectangular slot 2e.

Figure 2:
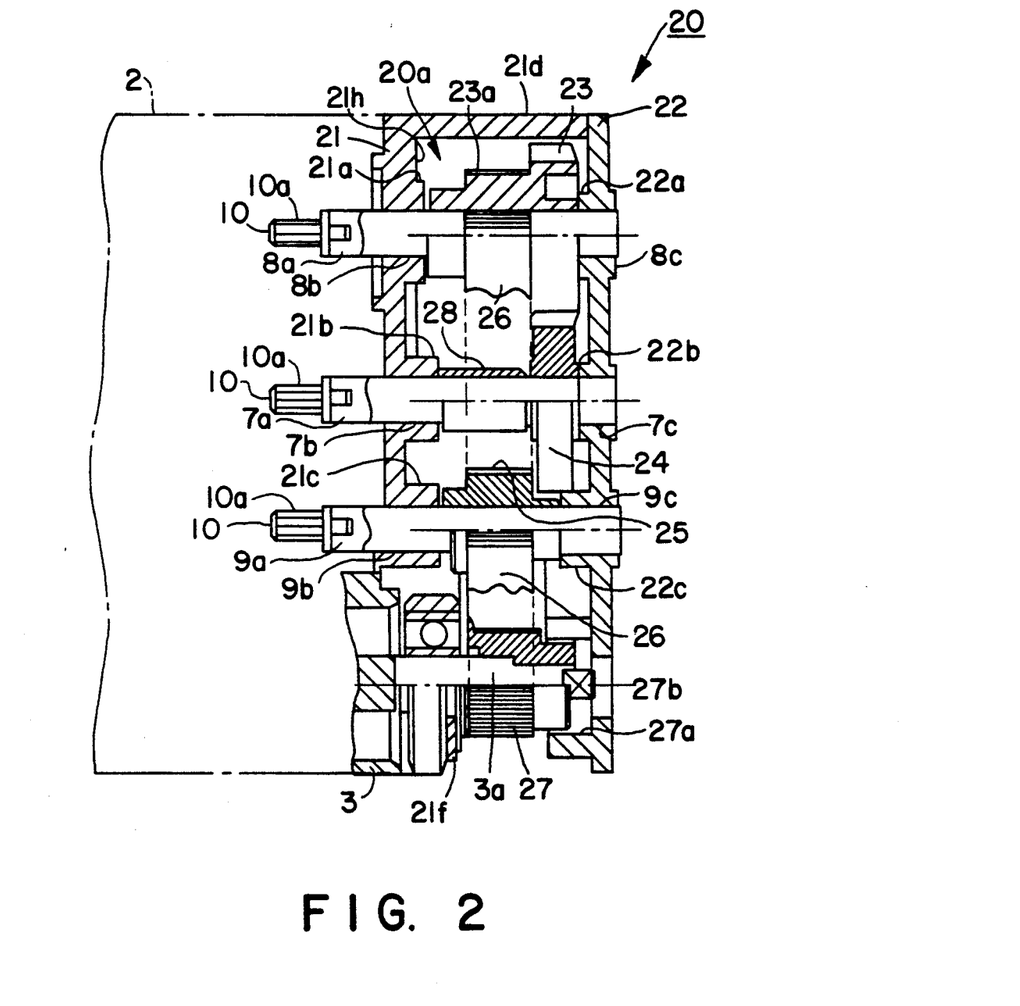
FIG. 2 is a side sectional view showing a structure of the drive transmission mechanism section of the embodiment of the present invention.
Figure 3:
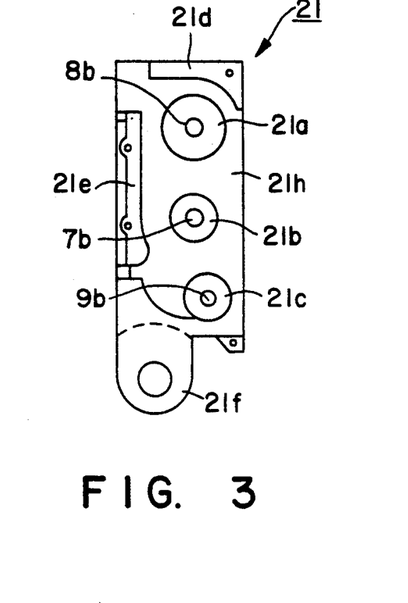
FIG. 3 is a plan view showing a shape of a base plate of a drive section of the embodiment of the present invention.

As shown in FIG. 2, the drive transmission mechanism section 20 is composed of the following units, in order from the top of the drawing to the bottom thereof: a driving section base plate 21 and driving section side plate 22 of which a driving section main body 20a is composed; a second stirring member transmission shaft 8a; a first gear 23 which is provided to the shaft 8a; a first stirring member transmission shaft 7a; a second gear 24 which is provided to the shaft 7a; a roller 28 which is rotatably provided to the first stirring member transmission shaft 7a; a supply roller transmission shaft 9a; a second gear 25 for a belt which is provided to the shaft 9a; a third gear 27 for the belt which is provided to the developing sleeve 3 and integrally rotated therewith; a first gear 23a for the belt which is integrally provided to the first gear 23; and an endless timing belt 26 which is wound around the second gear 25 for the belt and the third gear 27 for the belt. As shown in FIG. 3, the drive unit base plate 21 is a synthetic resin molding member which has an external form of almost the same size as a periphery of the side surface portion of the developing unit main body 2 provided with the upper cover 5. Further, as shown in FIG. 2 and FIG. 3, a pole 21d which is raised from a right upper end portion of a base 21h, and a pole 21e which is raised from an almost central portion of a left side end portion are provided on the drive unit base plate 21 in the manner that the poles 21d and 21e have respectively proper thickness and width which can bear stress without any trouble when the drive transmission mechanism 20 is driven.

The right side end surface shown in FIG. 2 from which the poles 21d and 21e rise is a surface to which the drive unit side plate 22 is provided. From the upper side of the drawing, a bearing boss 21a for the second stirring member transmission shaft 8a and a bearing hole 8b, a bearing boss 21b for the first stirring member transmission shaft 7a and a bearing hole 7b, a bearing boss 21c for the supply roller transmission shaft 9a and a bearing hole 9b, a play 27a for a developing sleeve shaft 3a and a mount 21f of the third gear 27 for the belt are provided respectively on the positions corresponding to the stirring members 8, 7, the supply roller 9 and the developing sleeve 3 at the almost central portion in the lateral direction of the base 21h. The bearing bosses 21a, 21b and 21c are each protrusively provided at a predetermined height along the poles, 21d and 21e, and the bearing holes 8b, 7b, and 9b are each provided through the bearing bosses 21a, 21b, and 21c. The right side end surface of the bearing bosses 21a, 21b, and 21c shown in FIG. 2 is a position determination surface and a slidable contact surface of the gears 23, 25 and the roller 28. The poles 21d, 21e, the bearing bosses 21a, 21b, 21c, the bearing holes 8b, 7b, 9b, the play for the developing sleeve shaft 3a, the mount 21f of the third gear 27 for the belt, ribs reinforced as necessary and plays which are not shown in the drawing, are integrally and simultaneously formed when molding the drive unit base plate 21.

The drive unit side plate 22 is a molded member made of a synthetic resin in which the side plate 22 has almost the same outer shape as that of the drive unit base plate 21 and is made of the same material.

Figure 4:
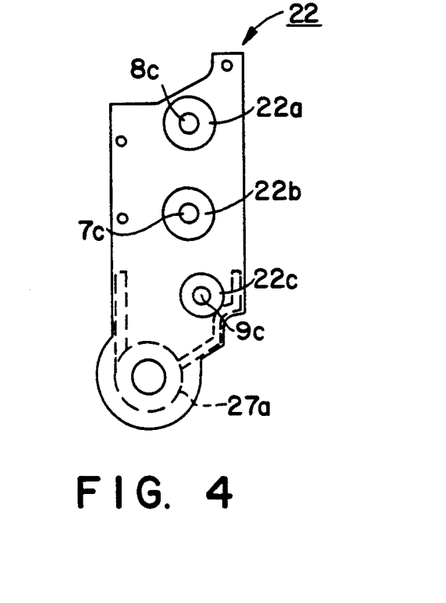
FIG. 4 is a plan view showing a shape of a side plate of the drive section of the embodiment of the present invention.

As shown in FIG. 2 and FIG. 4, a bearing boss 22a for the second stirring member transmission shaft 8a which is protruded at a predetermined height on both the surfaces of the driving unit side plate 22, and a bearing hole 8c which passes through the bearing boss 22a are provided on the position facing the bearing boss 21a and the bearing hole 8b, provided on the driving unit base plate 21, on the driving unit side plate 22. From the upper side of the drawing to the lower side, a bearing boss 22b for the first stirring member transmission shaft 7a which is protruded at the predetermined height on both the surface of the driving unit side plate 22, and a bearing hole 7c which passes through the boss 22b, and a bearing boss 22c for the supply roller transmission shaft 9a, and a bearing hole 9c which passes through the boss 22c, are provided on the position facing the bosses 21b, 21c and bearing holes 7c, 9c provided on the driving unit base plate 21. Further, at a lower position of the drawing, a play 27a for the third gear 27 for the belt which is engaged with the developing sleeve shaft 3a, and a play 27b which is coaxially provided with the play 27a, are provided. The bearing bosses 22a, 22b, 22c, and the bearing holes 8c, 7c, 9c, the plays 27a, 27b, and reinforcement ribs and plays, which are provided as necessary and not shown in the drawing, are integrally and simultaneously formed when molding the drive unit side plate 22. When the driving unit side plate 22 is integrally mounted by screws or the like on the right side end surfaces of the poles 21d, and 21e provided on the drive unit base plate 21, then the drive unit main body 20a is structured. When the drive unit side plate 22 is mounted on the drive unit base plate 21, central axes of bearing holes 8b, 7b, 9b and 8c, 7c, 9c, which face each other, are aligned correctly. Further, the distance between the surface of the bearing boss 21a of the drive unit base plate 21 and the surface of the bearing boss 22a of the drive unit side plate 22, which face each other, is set a little longer than the longitudinal length of the first gear 23, the first gear 23 is integrally engaged with the second stirring member transmission shaft 8a supported by the bearing holes 8b, and 8c, and rotatably provided between the bosses 21a, and 22a, and the second stirring member transmission shaft 8a is positioned in the axial direction. In the same manner as described above, the second gear 24 is integrally engaged with the first stirring member transmission shaft 7a, which is supported by the bearing holes 7b, and 7c, between the surface 21b and the surface 22b of the bearing bosses, which face each other, and on its left side, the roller 28 is rotatably provided.

The second gear 25 for the belt is integrally engaged with the supply roller transmission shaft 9a which is supported by the bearing holes 9b and 9c between the bearing bosses 21c and 22c. The rotation of the stirring member transmission shaft 8a is transmitted by the first gear 23 which is engaged with a drive source (not shown in the drawing).

The third gear 27 is inserted into the play 27a provided lower than the second gear, and the developing sleeve shaft 3a is engaged into a bearing hole provided corresponding to the center of axis of the third gear 27, and a hole having a sectional shape D, which is provided in the bearing hole of the third gear 27 and not shown in the drawing, is engaged with a shaft having a sectional shape D, which is provided on the developing sleeve shaft 3a and not shown in the drawing, and thus the driving force is transmitted.

The endless timing belt 26 which has been inserted previously when the drive unit base plate 21 and the drive unit side plate 22 were assembled, is wound around the first gear 23a for the belt, the second gear 25 for the belt and the third gear 27 for the belt, and thus the driving force is transmitted to the supply roller transmission shaft 9a and the developing sleeve 3 through the first gear 23 which is engaged with the drive source to be rotated. The rotation of the first stirring member transmission shaft 7a is transmitted by the second gear 24 which is directly engaged with the first gear 23. The roller 28 acts on an upper side (FIG. 2) of the endless timing belt 26 which is wound around the gears 23a, 25 and 27 for the belt so that the belt can be tightly stretched downward and the rotation can be transmitted efficiently.

Cut-out portions for rotation transmission into which couplings 10 are inserted, are provided on the center of axes of the stirring member transmission shafts 7a, 8a, and the supply roller transmission shaft 9a which are projected from the left side surface of the drive unit base plate 21, wherein the couplings 10 will be explained later.

Figure 5:
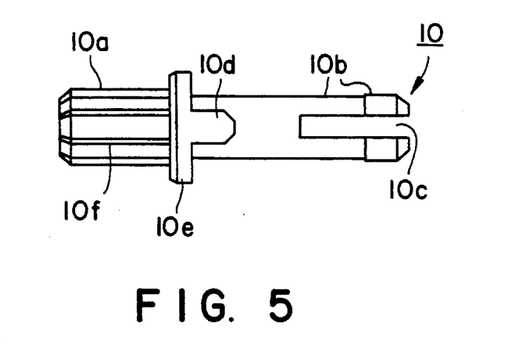
FIG. 5 is a side view showing a shape of a connecting member of the embodiment of the present invention.
Figure 6:
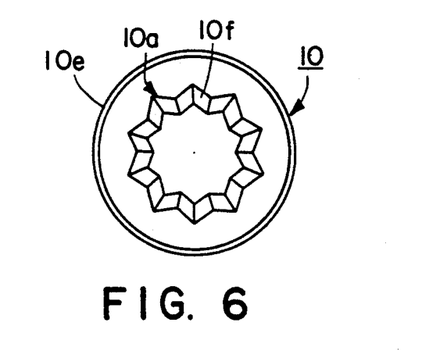
FIG. 6 is a plan view of FIG. 5.

The coupling 10 is a round bar like molded member made of synthetic resin material such as Delrin or Duracon as shown in FIGS. 5 and 6, and on the right side with respect to a flange 10e, a horizontal straight slit 10c is provided ranging from the central portion of an engagement portion 10b to be engaged with holes which are provided on the center of axes of stirring member transmission shafts 7a, 8a, and the supply roller transmission shaft 9a to the right end, and an inclined surface is provided on the peripheral surface on the right end so that the couplings can be easily inserted into holes of the transmission shafts 7a, 8a, and 9a, and tightly engaged with the holes by the elastic force of the engagement portion 10b having the slit 10c when the couplings are engaged with the holes of transmission shafts 7a, 8a, and 9a.

A shaft diameter of the end portion of the engagement portion 10b, on which the slit 10c is provided, is a little larger than a diameter of holes, as shown in the drawing, which are provided on the transmission shafts 7a, 8a, and 9a so that the end portion can not easily slip away from the hole.

As shown in the drawing, a protruded portion is raised from a part of the peripheral surface of the engagement portion 10b to the peripheral surface on the right side of the flange 10e, wherein the height of the protruded portion is the same as that of the peripheral surface of the flange 10e. The protruded portion 10d is engaged with the cut-out portion (not shown in the drawing) provided on each of the transmission shafts 7a, 8a, 9a, and the right side end surface of the flange 10e is engaged with the left side end surface of each of the transmission shafts 7a, 8a, 9a in the manner that the right side end surface of the flange 10e comes into contact with the left side end surface of each transmission shaft, and thereby each coupling 10 can be integrally rotated with each of the transmission shafts 7a, 8a and 9a.

As shown in FIGS. 5 and 6, a connection portion 10a is provided on the left side of each flange 10e so that it can be connected with each of the stirring members 7, 8 and the supply roller 9. Star-shaped teeth 10f having, for example, 10 equal parts, are provided on the connection portion 10a, and an appropriate inclined surface is provided on the peripheral surface of its left end portion.

An angle of the star-shaped teeth is 90°, and the height of the teeth is set to 0.2 mm. The coupling 10 is detachably engaged with each of the transmission shafts 7a, 8a, and 9a at the last step of assembling the drive transmission mechanism section 20.

As shown in FIG. 1, shafts 7d and 8d provided on both sides of the stirring members 7 and 8, are placed on a mount 4 provided near the right side surface portion 2b in the developing unit main body 2, and supported by the bearing portion 6 provided near the left side surface portion 2c. The stirring members 7 and 8 are positioned to be mounted in the manner that right side end surfaces of shafts 7d and 8d are positioned between the mount 4 and an inner wall surface of the right side surface portion 2b, and left side end surfaces of the shafts 7d and 8d are positioned between the bearing section 6 and an inner wall surface of the left side surface portion 2c.

Two U-shaped slots 4a, 4b, which are opened upwardly, are provided on the mount 4 at a predetermined distance therebetween, and the shafts 7d and 8d of the stirring members 7 and 8 are inserted into the slot from the upper side of the developing unit main body 2. The bearing section 6 is composed of bearing plates which are divided into two portions towards the upper and lower sides with respect to the developing unit main body 2, as will be described later in FIG. 7, and the shafts 7d and 8d are rotatably supported in the following manner: semi-circular recesses are provided respectively on the facing surfaces of the bearing plates at a predetermined distance; and the bearing plate 6 is inserted along the slot 2e of the developing unit main body 2, and the recesses face each other. The bearing section 6 which is divided into two is limited to move upwardly by the lower surface of the upper cover 5 to be mounted in a predetermined position of the upper surface of the developing unit main body 2. As described above, the stirring members 7 and 8 are mounted on the developing unit main body 2 in the manner that the stirring members are dropped together with the bearing section 6 from the upper side of developing unit main body 2.

Shafts 9d provided on both sides of the supply roller 9 are inserted from the upper side of the developing unit main body to U-shaped bearing mounts which are formed on inner wall surfaces of both the side surface portions 2b and 2c and are opened upwardly so that the shafts 9d can be positioned to be mounted. Upward movement of the supply roller 9 is limited, for example, by a support plate of the scraper 11 which is fixedly positioned on the upper surface of the bearing mount so that the supply roller 9 can be rotatably supported. Star-shaped connection holes, the shape of which are the same as that of the connection portion 10a, and with which the connection portions 10a of the couplings 10 are engaged, are provided on the center of axes of end portions of right side shafts 7d, 8d of the stirring members 7, 8 and the right side shaft 9d of the supply roller 9, shown in FIG. 1, with a predetermined depth from the end surfaces of the right side shafts 7d, 8d, and 9d. The star-shaped connection portion 10a is integrally engaged with the star-shaped connection hole in the following manner: the drive transmission mechanism section 20 structured as described above, is mounted on a predetermined position of the right side surface portion 2b of the developing unit main body 2; and thereby the connection portions 10a of the couplings 10 engaged with transmission shafts 7a, 8a, and 9a, are inserted into the connection holes of the stirring members 7, 8 and the supply roller 9 which are positioned near the right side surface portion 2b inside the developing unit main body 2, through bearing holes provided on the right side surface portion 2b.

At the same time, the transmission shafts 7a, 8a, and 9a are axially supported respectively by bearing holes provided on the right side surface portion 2b.

The center of axes of the stirring members 7, 8 and the supply roller 9 are correctly aligned previously with the bearing holes for the transmission shafts 7a, 8a and 9a provided on the right side surface portion 2b.

Accordingly, the drive transmission mechanism section 20 is set on a predetermined position of the developing unit main body 2 from the right side of the developing unit main body 2, and thereby the transmission shafts 7a, 8a and 9a can be engaged with the stirring members 7, 8 and the supply roller 9 through couplings 10 by only engaging their star-shaped teeth simply with each other, so that they are connected easily and surely inside the developing unit main body 2, and therefore, automatic assembling of the developing unit 1 can be conducted easily.

The developing sleeve 3, as described above, is axially supported by the third gear 27 for the belt at the same time as the connection of the stirring members 7, 8 and the supply roller 9 with the drive transmission shafts 7a, 8a and 9a.

An embodiment of the present invention has been described with respect to a connection method of the stirring members 7, 8 and the supply roller 9 with the transmission shafts 7a, 8a and 9a. However, with respect to a rotation member or a swinging member provided in the developing unit 1, they can also be connected inside the developing unit main body 2 using a similar member to the coupling 10, which is of course within the range of the present invention.

In the present invention, shaft members are connected with the drive transmission mechanism section inside the developing unit main body, and therefore they can be mounted respectively in the developing unit main body from simple directions, so that the developing unit can be automatically structured efficiently.

Even when a working space for the connection is small, and when an operator can not observe the connecting work, since a plurality of drive transmission shafts of the drive transmission mechanism section can be connected with a plurality of rotation members or swinging members from one direction simultaneously with a simple operation, the developing unit can be automatically assembled efficiently.

When the developing unit is assembled, the drive transmission means, which is formed into a unit, according to the present invention can be connected with the rotation members or the swinging members, which are mounted in the developing unit, from one direction with a simple operation, and thereby the developing unit can be automatically assembled efficiently.

Figure 7:
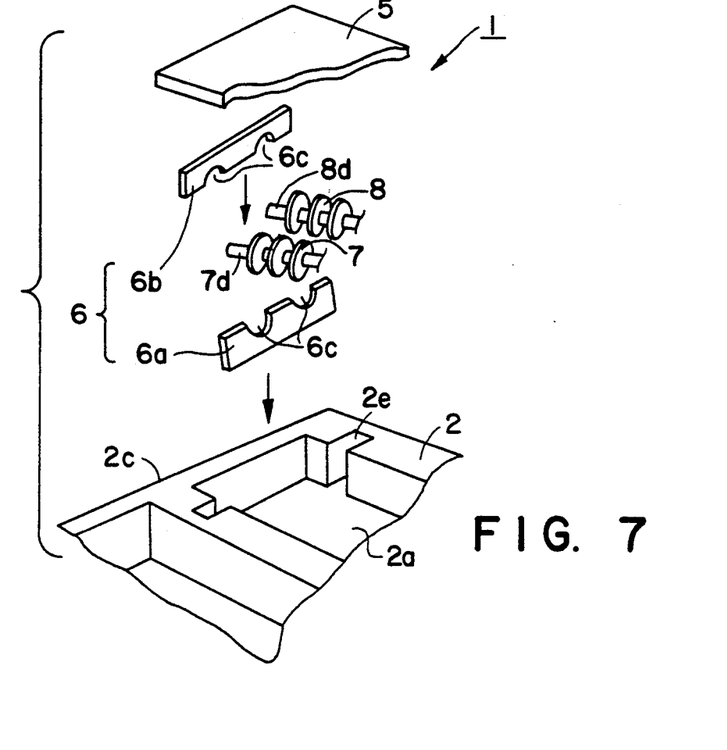
FIG. 7 is a perspective view showing a structure of a bearing means of a stirring member equipped in the developing unit.

Next, an embodiment by which the second object of the present invention can be accomplished will be explained by making bearing members of a plurality of stirring members an example. As shown in FIG. 1, square slots 2e into which a bearing plate 6 supporting left side shafts 8d, 7d of the second stirring member 8 and the first stirring member 7 is inserted, are provided on both side surface portions in the lateral direction of the developing unit main body 2 ranging from a bottom portion to a upper surface with a predetermined slot width and length. As shown in FIG. 7, the bearing plate 6 is divided into a lower bearing plate 6a and an upper bearing plate 6b, the shape of which are common, structured by a pair of plates, and formed by plate-shaped molding members made of synthetic resin material.

Semi-circular recesses 6c which are provided for supporting the lower half peripheral surfaces of the left side shafts 7d, 8d of the stirring members 7, and 8, are placed on the lower bearing plate 6a at a predetermined distance in the lateral direction. The upper bearing plate 6b serves as bearings for the upper half peripheral surfaces of the left side shafts 7d, and 8d. Accordingly, when recesses of the upper and lower bearing plates 6b and 6a face each other, bearing holes by which the left side shafts 7d, and 8d are rotatably supported, are formed.

Although not shown in the drawing, right side shafts of the stirring members 7 and 8 are positioned in the manner that the shafts are dropped from the upper side into bearing portions of mounts provided near the right side surface portion inside the developing unit main body 2. End surfaces of the right side shafts are positioned in the developing unit main body 2.

The stirring members 7, and 8 are mounted in the developing unit main body 2 in the following manner: the lower bearing plate 6a is inserted into the slot 2e from the upper side in the arrowed direction while the recess 6c is maintained upward; the left side shafts 7d, 8d of the stirring members 7 and 8 are engaged with the recesses 6c of the lower bearing plate 6a from the upper side; and at the same time, the right side shafts are engaged with predetermined positions of the mounts so that the shafts can be positioned in the developing unit main body.

When the upper cover 5 is integrally mounted on a predetermined position on the upper surface of the developing unit main body 2 after the upper bearing plate 6b is inserted along the slot 2e from the arrowed direction and placed on the upper surface of the lower bearing plate 6a, upward movement of the upper and lower bearing plates 6b, 6a is limited by the lower surface of the upper cover 5. The left side shafts 7d, and 8d of the stirring members 7, and 8 are rotatably supported by bearing holes formed by recesses 6c of the upper and lower bearing plates 6b, and 6a, at a predetermined distance.

Due to the aforementioned, when the bearing plate 6 is provided in the developing main body 2, a seal member to prevent toner from leaking which is provided conventionally in the bearing portion of the left side shafts 7d, and 8d, is not necessary. At the same time, when the stirring members 7 and 8 are assembled, the assembling work can be conducted simply from one direction since the lower bearing plate 6a, the stirring members 7, 8, the upper bearing plate 6b, and the upper cover 5 are successively dropped from the upper side of the developing unit main body 2, so that automatic assembly can be conducted easily.

Figure 8:
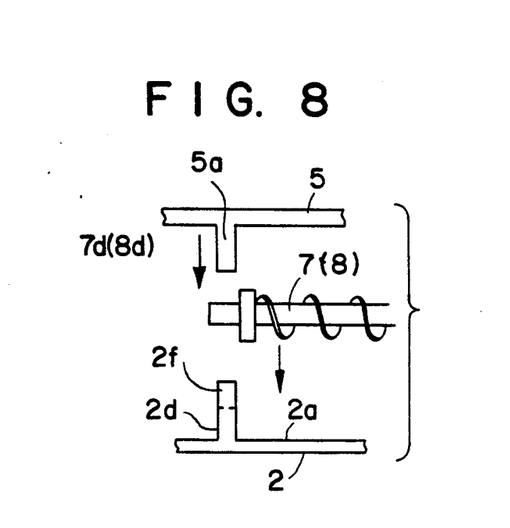
FIG. 8 is a side sectional view showing another embodiment of the aforementioned bearing means.
Figure 9:
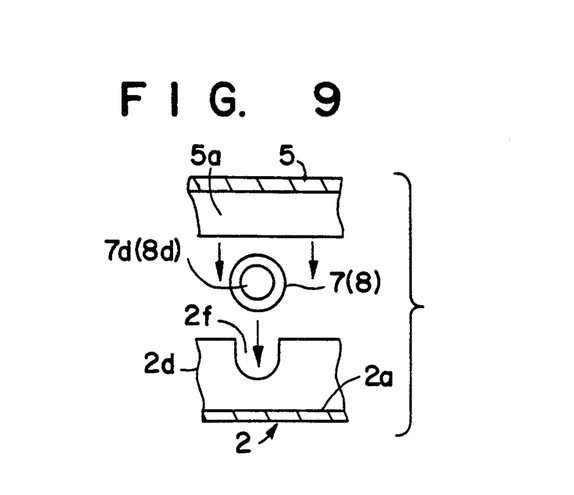
FIG. 9 is a front view of the aforementioned bearing means.

Next, another embodiment of a bearing means of the stirring members 7 and 8 will be explained as follows.

As shown in FIGS. 8 and 9, a bearing mount 2d which is equivalent to the outer shape of the lower bearing plate 6a is integrally raised from the bottom surface portion 2a of the developing unit main body 2. On the upper surface of the bearing mount 2d, two U-shaped bearing slots 2f with which the left side shafts 7d, and 8d of the stirring members 7, and 8 are engaged, are provided at a predetermined distance.

Dimensions of the U-shaped bearing slots 2f from the bottom of the slots to the upper surface of the bearing mount 2d are set to be slightly larger than the diameter of the left side shafts 7d and 8d.

The bearing mount 2d is integrally molded in the process of molding the developing unit main body 2.

A protruded member 5a is provided on the position which faces the bearing mount 2d on the lower surface of the upper cover 5, and when the upper cover 5 is mounted on a predetermined position on the developing unit main body 2, the lower surface of the protruded member 5a comes into contact with the upper surface of the bearing mount 2d. The left side shafts 7d and 8d of the stirring members 7 and 8 are successively dropped into the bearing slots 2f in the arrowed direction as shown in FIGS. 8 and 9, and then the upper cover 5 is mounted on the developing unit main body 2.

In the manner described above, upward movement of the left side shafts 7d and 8d of the stirring members 7 and 8 which are engaged with the bearing slots 2f, is limited by the lower surface of the protruded member 5a, and the left side shafts 7d and 8d are rotatably supported in the bearing slots 2f.

In the same manner as the aforementioned example, in another example, which is shown in FIGS. 8 and 9, and is structured as described above, a bearing portion is provided in the developing unit main body 2 and the bearing portion is divided into upper and lower directions crossing at right angles with respect to center lines of the left side shafts 7d, and 8d of the stirring members 7 and 8, and thereby the same effects as the aforementioned example shown in FIG. 7 can be obtained.

The present invention is not limited to the above-described examples.

Figure 11:
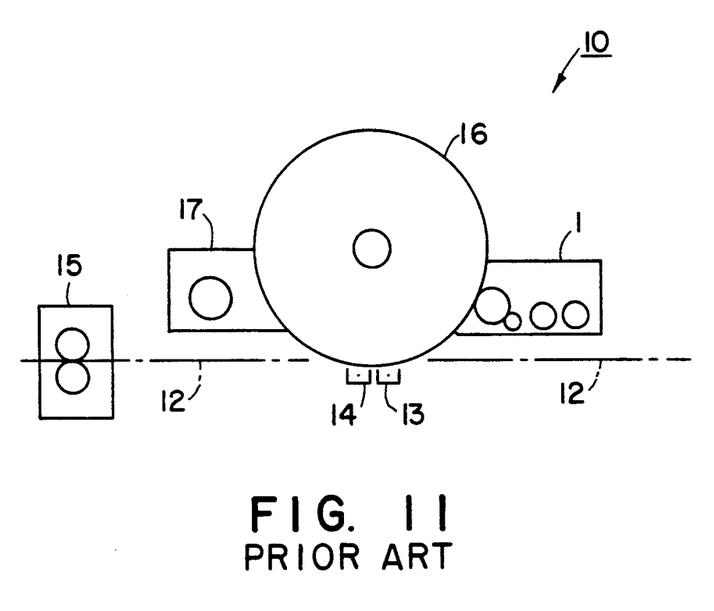
FIG. 11 is a view showing an outline of a structure of an image forming apparatus.

As shown in FIG. 11, the electrophotographic image forming apparatus 10 is at least composed of the following process units: the photoreceptor drum 16 which is an image carrier and rotated endlessly; the developing unit 1 by which toner is given to the electrostatic latent image formed on the photoreceptor 16 surface to develop the latent image; the transfer electrode 13 which transfers the toner image onto the surface of the recording sheet 12 conveyed to the lower side of the peripheral surface of the photoreceptor 14; the discharger 16; the fixing unit 15 by which the toner image transferred onto the recording sheet 12 is fixed; and the cleaning unit 17 by which toner or paper powder remaining on the photoreceptor 16 surface after the toner image has been transferred onto the recording sheet 12, is removed.

By means of the above-described process units noted by numerals 1, 13, 14, 15, 16 and 17, predetermined toner images are successively recorded on the surfaces of the recording sheets 12 which are intermittently conveyed on a predetermined conveyance path.

The bearing means of the present invention can be applied to bearing means by which the photoreceptor drum 16, the stirring members of the developing unit 1, the fixing roller of the fixing unit 15, the cleaning roller of the cleaning unit 17, which are provided to the image forming apparatus 10, are supported.

Examples of the present invention were explained with regard to the bearing means of the stirring members 7 and 8 of the developing unit 1, however it is a matter of course that the divided bearing means, which is obtained by the same method as the aforementioned, can be applied to the bearing portion by which the photoreceptor drum 16, the fixing roller of the fixing unit 15, and the cleaning roller of the cleaning unit 17 are supported.

By means of the bearing means according to the present invention, automatic assembly of process units such as the photoreceptor drum, developing unit, and cleaning unit, which are provided to the image forming apparatus, can be conducted easily, and seal members to prevent toner from leaking which are provided to the bearing portion of the developing unit can be eliminated.

What is claimed is:

1. A developing apparatus for use with a photoreceptor to form a toner image, said apparatus comprising
a housing wherein toner is stored;
a plurality of toner handlers, each of said toner handlers including shaft member, and a handling member which rotates or swings about said shaft member, each said handling member disposed within said housing;
a transmission dismountably mounted on said housing, said transmission including a plurality of output shafts, each of said output shafts transmitting driving force to one said shaft member;
a plurality of coupling members each including an insertable shaft having a circumferential surface and an axis, and a receiving member having an axial hole therein to receive said insertable shaft;
a plurality of grooves in said circumferential surface, said grooves extending in an axial direction parallel to said axis, adjacent said grooves being spaced apart circumferentially at substantially equal distances to form a plurality of teeth; an inside wall of said axial hole being grooved in said axial direction and being complementary to said teeth, whereby said insertable shaft can be inserted into said receiving member in an arbitrary rotational relationship with said receiving member;
each said shaft member being provided with either said insertable shaft or said receiving member, and each output shaft is provided with the other of said insertable shaft and said receiving member, so that each said shaft member and each of said output shafts are engaged or disengaged simultaneously by mounting or dismounting said transmission.

2. The apparatus of claim 1 further comprising entry ends of said teeth adjacent an outer end of said insertable shaft being tapered axially and outwardly whereby insertion of said insertable shaft into said hole is facilitated.

3. The apparatus of claim 1 wherein said transmission includes transmitting members and a box, said transmitting members being incorporated in said box whereby said transmission constitutes a unit.

4. The apparatus of claim 1 wherein one end of each of said coupling members is fixed to said transmission and the other end detachably engages said shaft member.

5. The apparatus of claim 3 wherein said other end of each of said coupling members is provided with a plurality of projections, and an end portion of said shaft member is provided with a hole adapted to receive said other end and said projections.

6. A developing apparatus for use with a photoreceptor, said apparatus comprising
a housing wherein toner is stored,
a plurality of toner handlers, each of said handlers including a shaft member, and a handling member which rotates or swings about said shaft member, each said shaft member having a length smaller than an inside dimension of said housing;
a transmission for transmitting a driving force to said shaft member;
a coupler for mechanically connecting said transmission and said shaft member at a point adjacent one end of said transmission and within said housing; and
a bearing plate supporting said shaft member, said bearing plate comprising an upper plate and a lower plate located adjacent an end of said shaft member remote from said transmission and within said housing.

* * * * *